(12) United States Patent
Watanabe et al.

(10) Patent No.: US 9,519,965 B2
(45) Date of Patent: Dec. 13, 2016

(54) DISPLAY PROCESSING METHOD AND APPARATUS

(71) Applicants: FUJITSU LIMITED, Kawasaki-shi, Kanagawa (JP); The University of Tokyo, Tokyo (JP)

(72) Inventors: Masahiro Watanabe, Kawasaki (JP); Satoshi Fuchikami, Fukuoka (JP); Tadashi Ataka, Kawasaki (JP); Yoshimasa Kadooka, Kawasaki (JP); Toshiaki Hisada, Tokyo (JP); Seiryo Sugiura, Tokyo (JP); Takumi Washio, Tokyo (JP); Jun-Ichi Okada, Tokyo (JP)

(73) Assignees: FUJITSU LIMITED, Kawasaki (JP); The University of Tokyo, Tokyo (JP)

( * ) Notice: Subject to any disclaimer, the term of this patent is extended or adjusted under 35 U.S.C. 154(b) by 187 days.

(21) Appl. No.: 14/246,434

(22) Filed: Apr. 7, 2014

(65) Prior Publication Data
US 2014/0306960 A1    Oct. 16, 2014

(30) Foreign Application Priority Data

Apr. 15, 2013   (JP) ................................. 2013-085277

(51) Int. Cl.
*G06T 15/08*   (2011.01)
*G06T 7/00*    (2006.01)

(52) U.S. Cl.
CPC ............ *G06T 7/0012* (2013.01); *G06T 15/08* (2013.01)

(58) Field of Classification Search
None
See application file for complete search history.

(56) References Cited

U.S. PATENT DOCUMENTS

| 5,038,302 A | 8/1991 | Kaufman |
| 2005/0201598 A1* | 9/2005 | Harel ................ G06T 7/0012 382/128 |

(Continued)

FOREIGN PATENT DOCUMENTS

| WO | WO 2006/067719 A2 | 6/2006 |
| WO | WO 2008/066907 A1 | 6/2008 |

OTHER PUBLICATIONS

Extended European Search Report issued Sep. 9, 2015 in Patent Application No. 14164202.5.

(Continued)

*Primary Examiner* — Ryan M Gray
(74) *Attorney, Agent, or Firm* — Oblon, McClelland, Maier & Neustadt, L.L.P.

(57) ABSTRACT

A disclosed method includes: performing a processing for adjusting positions of voxel data for an object and data of a geometric model for the object; calculating, for each voxel included in a range defined by a cross section among plural voxels that are included in the voxel data, a voxel value of the voxel from physical values in elements of the geometric model, which are included in a predetermined range of the voxel, based on a relation between the cross section and vectors; and rendering an image by using the voxel value calculated for each voxel. A vector of the vectors is set for one element of plural elements included in the geometric model, the vectors represent a direction of an inner structure of the object, and the cross section is set for the voxel data and the geometric model data.

4 Claims, 10 Drawing Sheets

(56) References Cited

U.S. PATENT DOCUMENTS

| | | | |
|---|---|---|---|
| 2009/0096787 A1* | 4/2009 | Masumoto | G06T 7/0012 345/424 |
| 2010/0201687 A1* | 8/2010 | Breeuwer | G06T 15/08 345/424 |
| 2011/0170658 A1* | 7/2011 | Arakita | A61B 6/032 378/8 |
| 2012/0027276 A1* | 2/2012 | Chono | A61B 5/02028 382/128 |
| 2012/0162217 A1* | 6/2012 | Lim | G06T 15/205 345/419 |
| 2013/0002646 A1* | 1/2013 | Lin | G06T 7/0012 345/419 |
| 2013/0266230 A1* | 10/2013 | Peters | G06T 7/0032 382/224 |

OTHER PUBLICATIONS

Yoko Eto, et al., "Automated Mitral Annular Tracking: A Novel Method for Evaluating Mitral Annular Motion Using Two-dimensional Echocardiography", Journal of the American Society of Echocardiography, vol. 18, No. 4, Apr. 2005, 7 pages.

* cited by examiner

DISPLAY PROCESSING METHOD AND APPARATUS

CROSS-REFERENCE TO RELATED APPLICATIONS

This application is based upon and claims the benefit of priority of the prior Japanese Patent Application No. 2013-085277, filed on Apr. 15, 2013, the entire contents of which are incorporated herein by reference.

FIELD

This invention relates to a display processing program, method and apparatus.

BACKGROUND

Recently, various analysis is performed for organs of the human being, especially a heart. More specifically, the blood is ejected toward the entire body by the heart muscle that contracts in response to electrical signals, and the numerical analysis (i.e. simulation) for reproducing this phenomenon of the heart is performed. Then, the behavior of the heart muscle, which is obtained as results of the numerical analysis, is displayed by using a technique of the three-dimensional computer graphics (CG).

On the other hand, in the medical site, by using medical measurement apparatus such as ultrasonic echo apparatus, Magnetic Resonance Imaging (MRI) apparatus, Computed Tomography (CT) scan apparatus and the like, information of organs such as the cross section of the heart muscle is measured. The information of the cross section of the heart muscle is two-dimensional data, typically.

Both of them express the behavior of the heart muscle, there are demands to compare the results of both of them. However, because data formats of both of them are different, it is possible to display both of them left and right, however, it is not easy to display a state in which both of them are disposed at appropriate positions so as to superimpose them in accordance with the time course. In other words, it is not easy to superimpose them only by putting the origins of them together and scaling.

In addition, element shapes, by which the space is divided, are different each other. In other words, the medical data is represented by the voxel data, and the shape data used in the simulation is represented by a set of tetrahedral elements. In such a case, it is possible to put the outer shapes of the hearts together and cause one heart to be penetrated by the CG technique. However, because the observation is performed for the voxel data in the conventional medical service, it may be preferable that the distribution of physical values can be observed by displaying the well-known voxel data.

Non-Patent Document 1: Yoko Eto, et. al., "Automated Mitral Annular Tracking: A Novel Method for Evaluating Mitral Annular Motion Using Two-dimensional Echocardiography", *Journal of the American Society of Echocardiography*, pp. 306-312, Volume 18 Number 4, (2005)

SUMMARY

According to one aspect of embodiments, a display processing method includes: (A) performing a processing for adjusting positions of voxel data for an object and data of a geometric model for the object; (B) calculating, for each voxel included in a range defined by a cross section among plural voxels that are included in the voxel data, a voxel value of the voxel from physical values in elements of the geometric model, which are included in a predetermined range of the voxel, based on a relation between the cross section and first vectors, wherein a first vector of the first vectors is set for one element of plural elements included in the geometric model, the first vectors represent a direction of an inner structure of the object, and the cross section is set for the voxel data and the geometric model data; and (C) rendering an image by using the voxel value calculated for each voxel.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Figure 1:
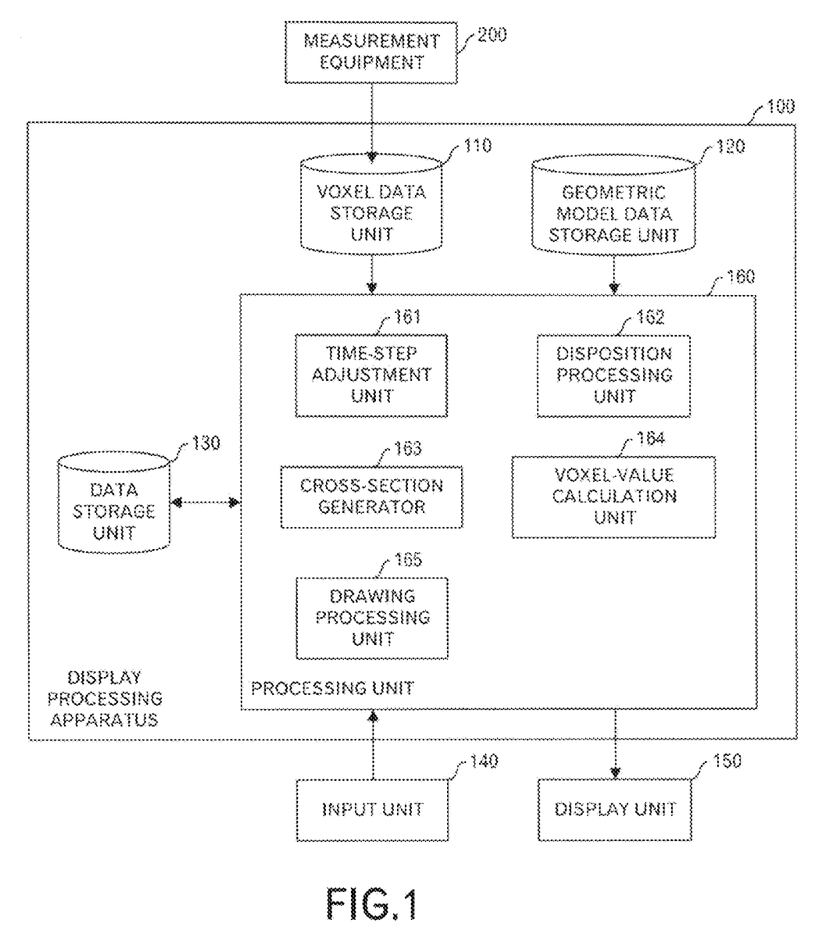
FIG. 1 is a functional block diagram of a display processing apparatus relating to an embodiment of this invention.

FIG. 1 illustrates a functional block diagram of a display processing apparatus relating to an embodiment of the present invention. The display processing apparatus 100 is connected to a measurement equipment 200 such as an ultrasonic echo apparatus, MRI apparatus or CT scan apparatus, and is also connected to an input unit 140 and display unit 150. Moreover, the display processing apparatus 100 has a voxel data storage unit 110 that stores voxel data received from the measurement equipment 200, a geometric model data storage unit 120 that stores data of the three-dimensional geometric model and the like, a data storage unit 130 that stores data in progress, and a processing unit 160 that executes a processing related to this embodiment.

Figure 2:
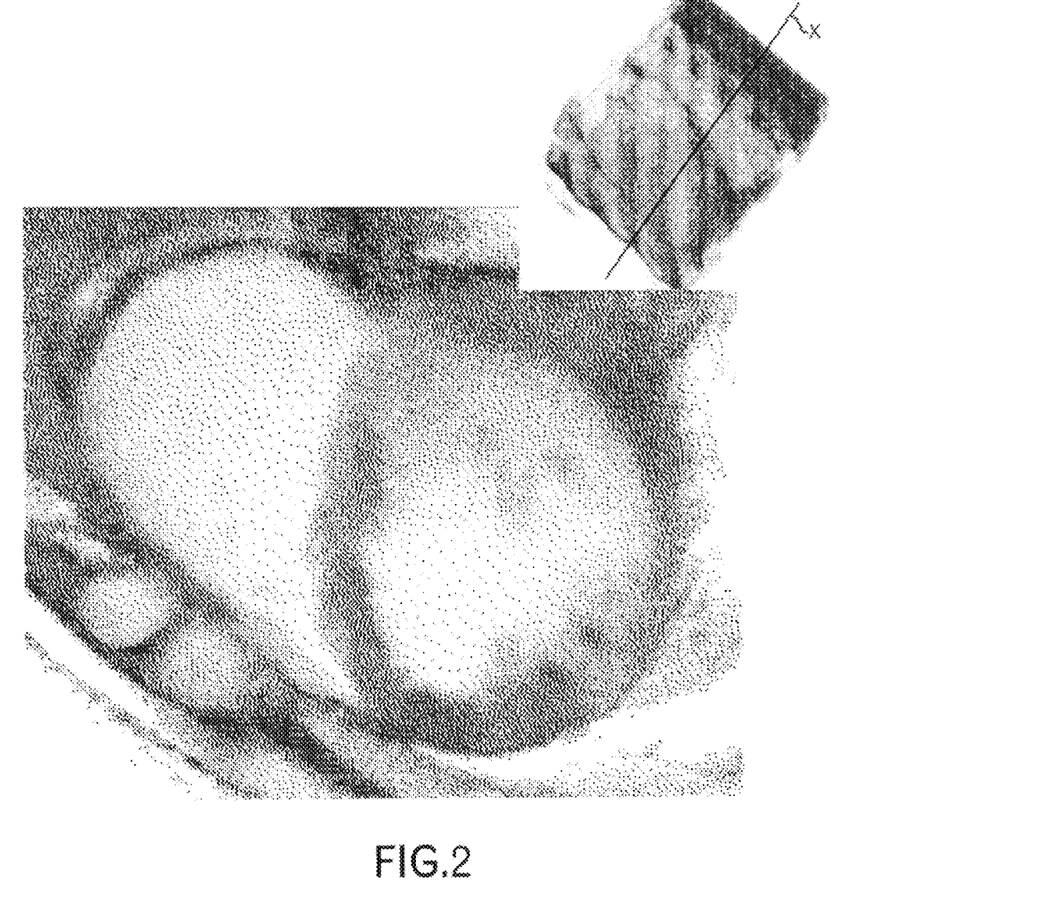
FIG. 2 is a diagram depicting an example of an image generated from voxel data.
Figure 3:
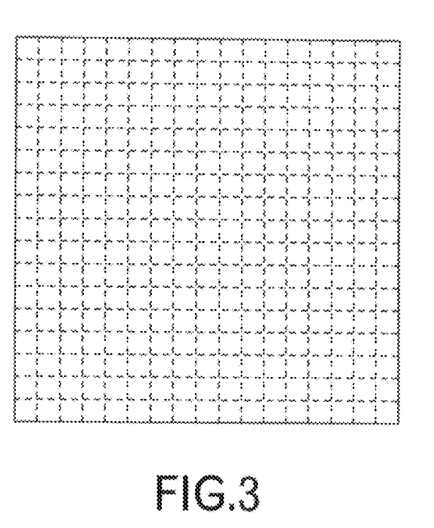
FIG. 3 is a diagram to explain the voxel data.

The voxel data storage unit 110 stores voxel data outputted by the measurement equipment 200 at plural time steps that are lined up at intervals of a predetermined time, for example. The voxel data represents a set of voxels. FIG. 2 illustrates an example of image data that is generated from the voxel data. The upper right of FIG. 2 represents a portion of the heart, and when the heart is cut by a cross section X and drawn, an image as illustrated in the lower left of FIG. 2 is obtained. In an image illustrated in the lower left of FIG. 2, a circular portion on the right side represents the heart muscle of the left ventricle. One cube obtained by dividing an object in the three-dimensional grid manner is called "a voxel" so as to correspond to "a pixel" in the two-dimensional image. In other words, each voxel is represented by a square when it is flatly drawn as illustrated in FIG. 3, and a physical value (scalar value or vector value) is disposed at its center portion.

The geometric model data storage unit 120 stores geometric model data (e.g. tetrahedral element data) in a time series, which was generated by a simulator, during one beat of the heart, in case of the heart. The geometric model data includes coordinate values of each vertex of the tetrahedral elements for identifying the shape, element information, physical values on each element, and the like, for example. In case of the heart, the geometric model data includes the heart muscle data and blood flow data.

The physical value of the heart muscle is a scalar value or tensor value. In case of the scalar value, at least one scalar value is defined for each tetrahedral element. In case of the tensor value, the size or magnitude of either of three diagonal elements is defined for each element or a scalar value that is derived from 9 values of the tensor, such as von Mises stress value, is defined.

Figure 4A:
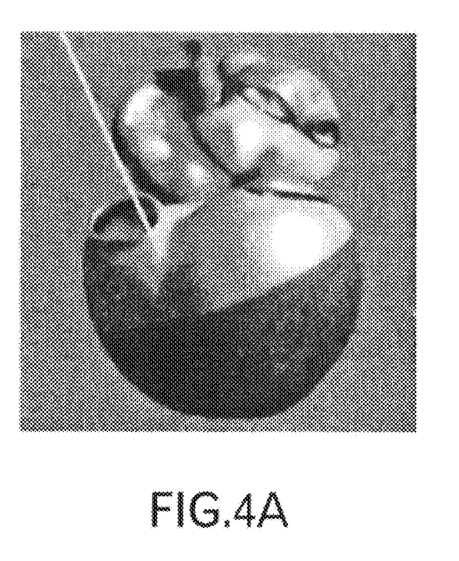
FIG. 4A is a diagram depicting an example of a geometric model.
Figure 4B:
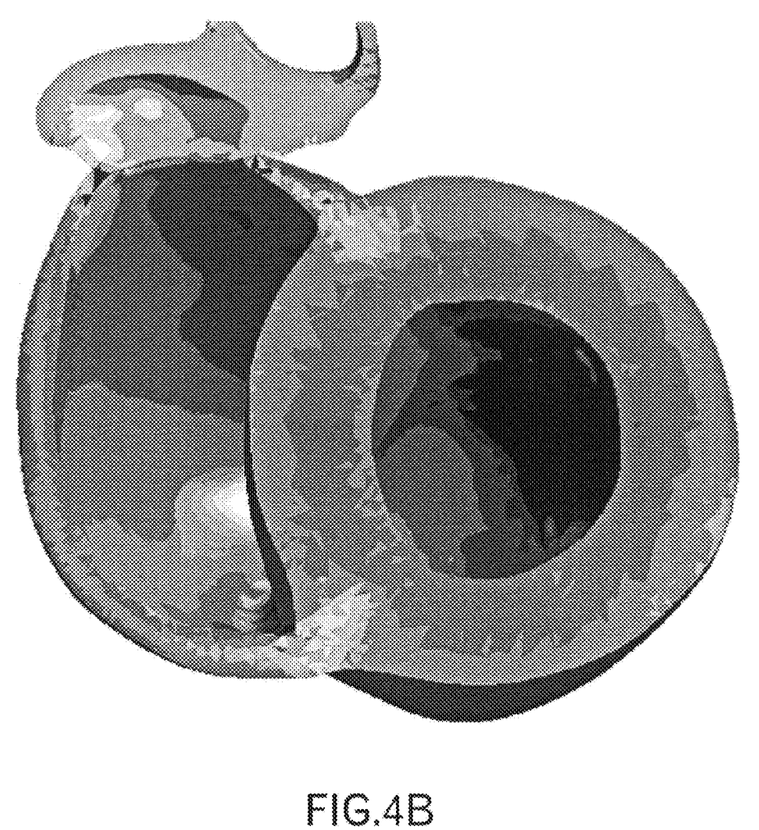
FIG. 4B is a diagram depicting an example of an image that represents stress on a cross section of the geometric model.

FIG. 4A illustrates an example of a geometric model of the entire heart, and in FIG. 4A, a boundary line between dark and light portions corresponds to the cross section X in FIG. 2. FIG. 4B illustrates an example that this cross section is drawn so that a deeper color is drawn when the stress value in the tetrahedral element is greater. It is understood that the stress inside of the heart muscle of the left ventricle, which is illustrated in the right side, is high.

Figure 5:
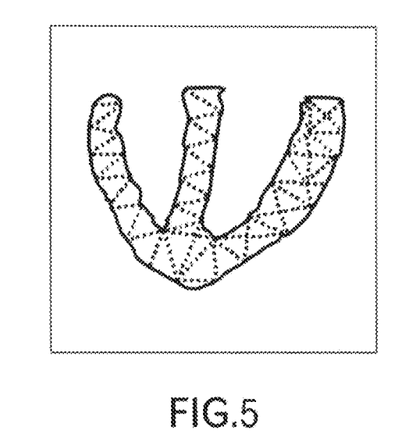
FIG. 5 is a diagram depicting triangular division of the geometric model on a plane.

As schematically illustrated in FIG. 5, the geometric model is divided into the tetrahedral elements (in FIG. 5, triangles because the space is two-dimensional.).

Figure 6:
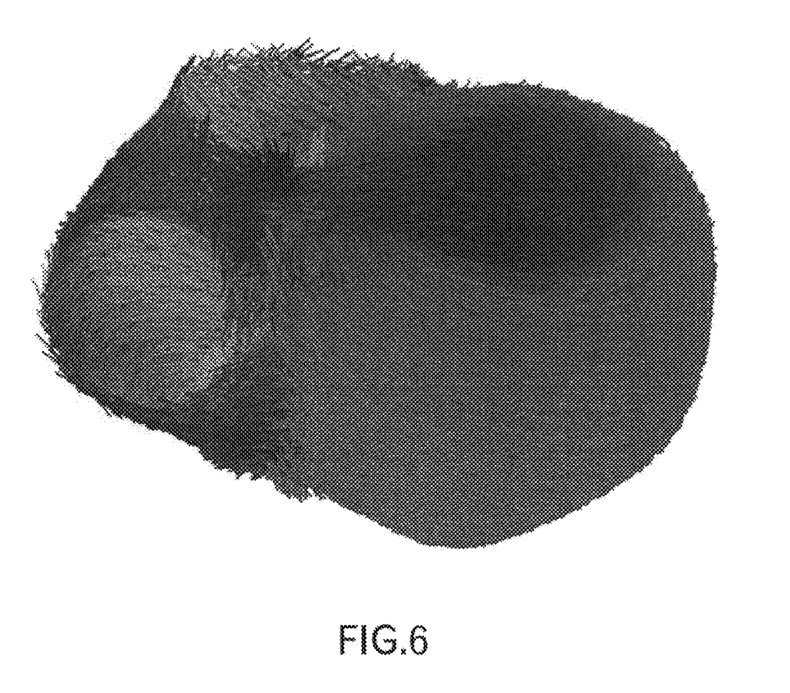
FIG. 6 is a diagram depicting an example of vectors that represent fiber directions of a heart muscle.

Moreover, the geometric model data storage unit 120 also stores data representing the fiber direction of the heart muscle (also called heart muscle fiber data). A unit vector representing the fiber direction of the heart muscle is set for each tetrahedral element. For example, when the unit vectors representing the direction of the heart muscle fiber are superimposed in case of the heart, a state as illustrated in FIG. 6 is obtained. The unit vector representing the fiber direction of the heart muscle is also called "a unit vector" representing the direction of the inner structure of an object (here, the heart).

The processing unit 160 has a time-step adjustment unit 161, a disposition processing unit 162, a cross-section generator 163, a voxel-value calculation unit 164 and a drawing processing unit 165.

The time-step adjustment unit 161 extracts data of the geometric models so as to synchronize the time-step intervals of the voxel data, for example, because the number of time steps of the voxel data in a period of one beat of the heart, for example, is different from the number of time steps of the geometric model.

The disposition processing unit 162 disposes voxel data and geometric model data in a virtual three-dimensional space, and performs a processing for adjusting both positions of them according to an instruction or the like from the input unit 140. Any existing method can be employed for this processing for adjusting positions. For example, plural control points are disposed for both data, and scaling, parallel movement and/or rotation are performed for former or latter data so as to move corresponding control points to the same position.

Furthermore, in response to an instruction from a user, the cross-section generator 163 identifies voxel data within a designated cross section in the voxel data, and tetrahedral element data within the designated cross section in the geometric model data.

Moreover, the voxel-value calculation unit 164 calculates a voxel value in a voxel on the designated cross section from the tetrahedral element data in the designated cross section and corresponding heart muscle fiber data. The voxel value is a value in a center of one voxel.

Moreover, the drawing processing unit 165 generates image data for the designated cross section by using the voxel values calculated by the voxel-value calculation unit 164, and cause the display unit 150 to display the image data.

Next, processing contents of the display processing apparatus 100 will be explained by using FIGS. 7 to 13.

Figure 7:
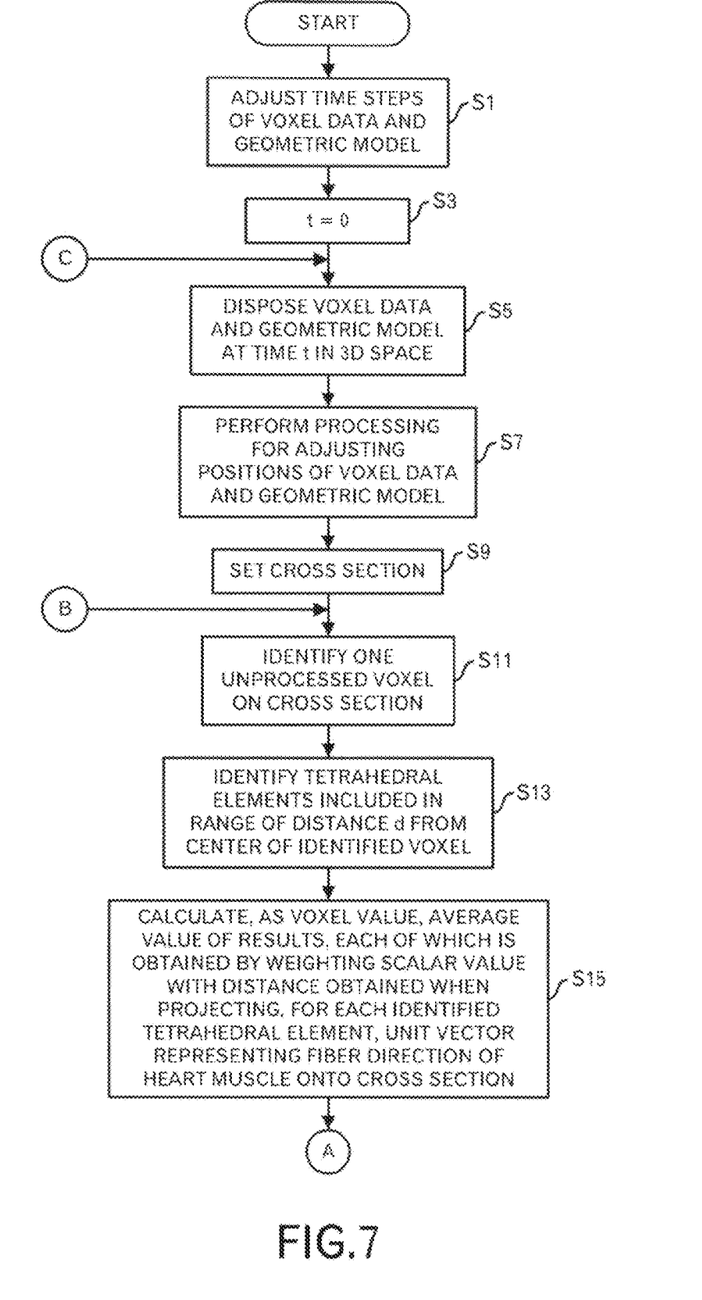
FIG. 7 is a diagram depicting a processing flow relating to this embodiment.

First, the time-step adjustment unit 161 of the processing unit 160 performs a processing for adjusting the time steps of the voxel data and geometric model from the time-step intervals of the voxel data stored in the voxel data storage unit 110 and the time-step intervals of the geometric models stored in the geometric model data storage unit 120 (FIG. 7: step S1).

Figure 8:
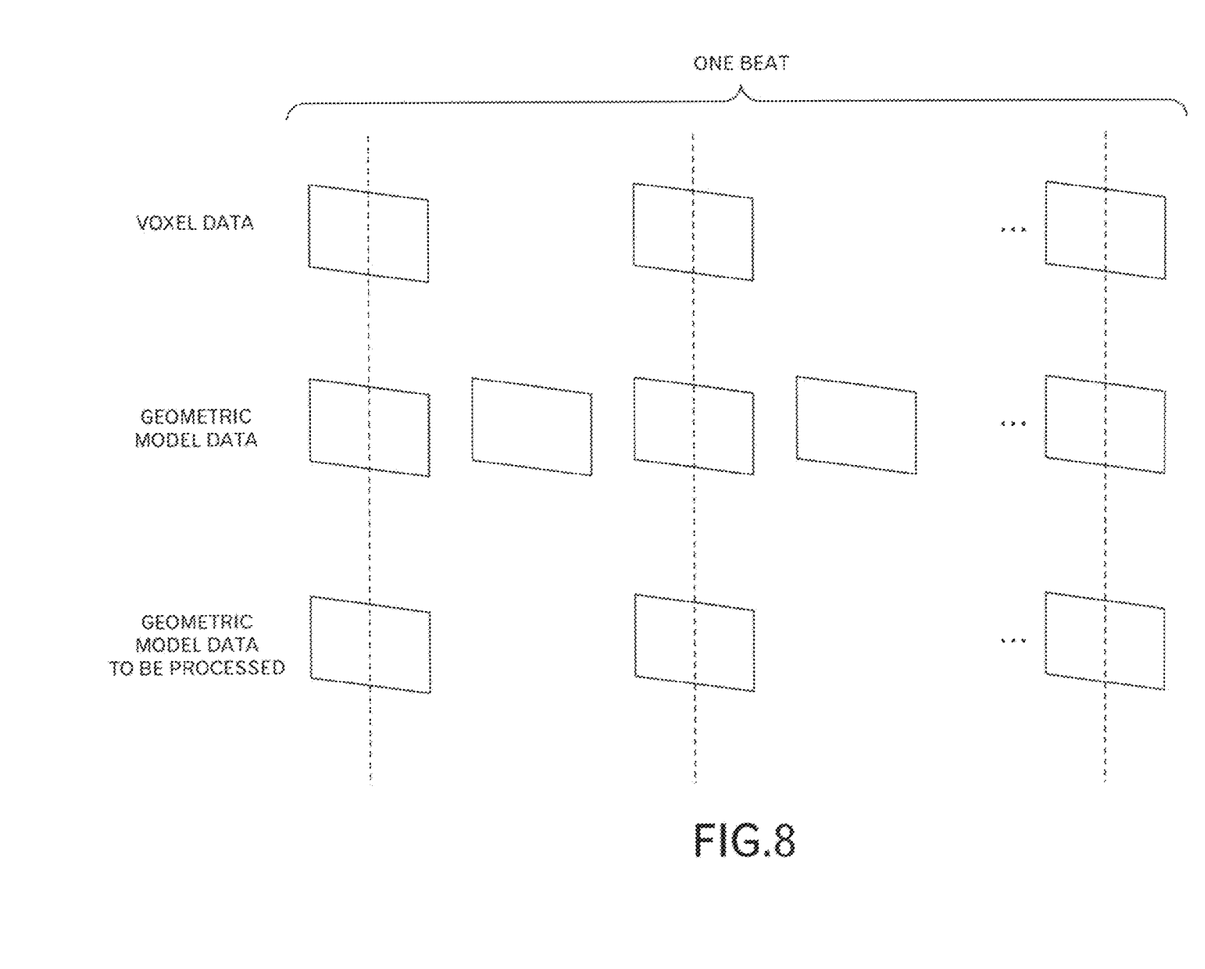
FIG. 8 is a diagram to explain adjustment of a time step.
Figure 9:
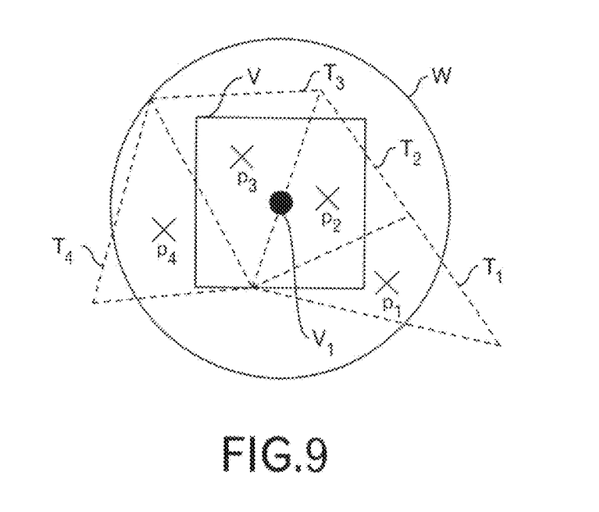
FIG. 9 is a diagram depicting an example of tetrahedral elements included in a predetermined distance from a specific voxel.

Because the intervals of the time step of the voxel data are typically longer, data of the geometric model is extracted so that the intervals of the time step of the voxel data are equal to the intervals of the time step of the geometric model, for example. This processing is schematically illustrated in FIG. 8. For example, when the voxel data and data of the geometric model are arranged for one heart beat, the geometric models whose number of time steps is greater than the number of time steps of the voxel data are prepared. Then, by extracting the data of the geometric models at the same times (dotted lines in the vertical direction) as those of the voxel data, the extracted geometric models are used as processing targets. In an example of FIG. 8, an example is illustrated in which the data of the geometric models at the same times exist. However, by, for example, interpolating the geometric models after and before the time if the data of the geometric models do not exist, the data of the geometric model at that time is generated. However, when the gap between the time of the geometric model and the time of the voxel data is lesser, the geometric model at the time may be extracted as it is without interpolation. Moreover, when the time-step intervals of the voxel data are shorter, the voxel data may be extracted so that the time of the voxel data is equal to the time of the geometric model.

Next, the processing unit 160 sets "0" as time t (step S3). Then, the disposition processing unit 162 disposes the voxel data and geometric model data in the virtual three-dimensional space (step S5), and performs a processing for adjusting the positions (step S7). As described above, because the existing method can be applied, further explanation is omitted. The position adjustment may be performed by accepting the user's instruction from the input unit 140.

Moreover, the cross-section generator 163 sets the cross section according to the user's instruction, which was accepted by the input unit 140, and identifies the voxel data within the set cross section in the voxel data (step S9).

Then, the voxel-value calculation unit 164 identifies one unprocessed voxel in the set cross section (step S11). For example, a list of voxels relating to the set cross section is generated, and unprocessed voxels are identified according to the list.

After that, the voxel-value calculation unit 164 identifies tetrahedral elements whose center of gravity is included in a range of a preset distance d from the center of the voxel identified at the step S11 (step S13). In an example of FIG. 9, tetrahedral elements (here, triangles) $T_1$ to $T_4$ whose center of gravity is included in the range W of the distance d from the center V1 of one voxel V are identified. The center of gravity of the tetrahedral element $T_1$ is $p_1$, the center of gravity of the tetrahedral element $T_2$ is $p_2$, the center of gravity of the tetrahedral element $T_3$ is $p_3$, and the center of gravity of the tetrahedral element $T_4$ is $p_4$. By performing this processing, a list of indices of the tetrahedral elements is generated. Thus, even when a tetrahedral element is larger than one voxel, tetrahedral elements corresponding to the voxel can be identified.

Figure 10:
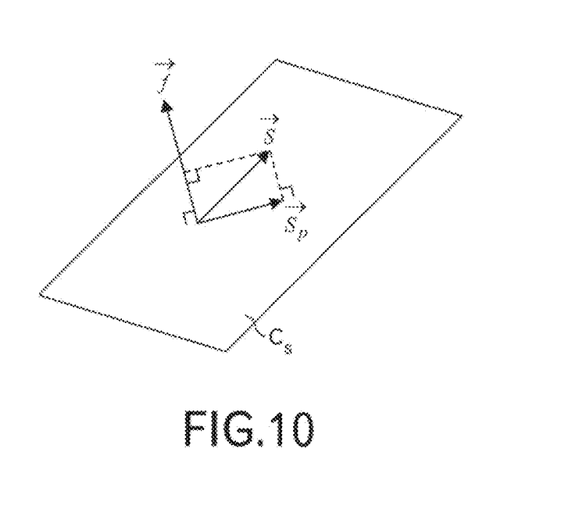
FIG. 10 is a diagram depicting a relation between the cross section and vectors that represent the fiber directions of the heart muscle.

Then, the voxel-value calculation unit 164 calculates, as a voxel value $v_c$, an average value of results obtained by weighting the physical value with a length obtained when projecting the unit vector representing the fiber direction of the heart muscle to the set cross section for the voxel identified at the step S11 (step S15). As illustrated in FIG. 10, when the cross section Cs is set, its normal vector f is determined. Then, because the unit vector S representing the fiber direction of the heart muscle is set for each tetrahedral element as described above, a vector Sp on the plane Cs is obtained when projecting the unit vector S onto the plane Cs.

Then, a following calculation is performed at the step S15.

$$v_c = \frac{\sum_{i=1}^{n} T(S_i) v_i}{n}$$

$v_i$ represents a scalar value set for the i-th tetrahedral element. Moreover, n represents the number of tetrahedral elements identified at the step S13. Furthermore, T(Si) is a function that returns a length (which is equal to or less than 1) obtained when projecting the unit vector Si set for the i-th tetrahedral element onto the cross section Cs.

For example, simulation is performed so that cells changes their shapes by one tetrahedral element unit within the heart muscle, and their changes reflect on the final changes of the tetrahedral elements. At that time, the unit vectors representing the fiber direction of the heart muscle are inputted as the model. For example, when the output results of the simulation are outputted as the stress tensor in each axis direction of the tetrahedral element, data concerning what stress exists in what direction is obtained. The activity state of the heart muscle, which is represented by this stress data, can be represented by the aforementioned new voxel value $v_c$ on the set cross section.

Figure 11:
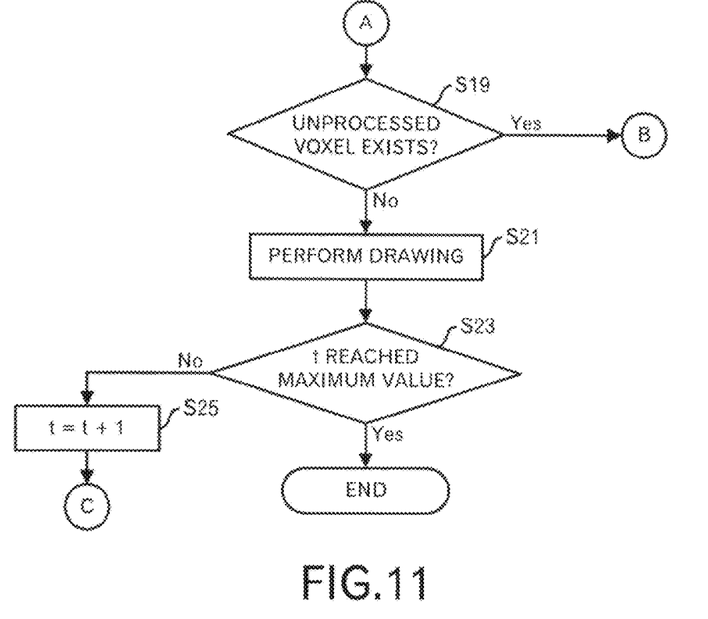
FIG. 11 is a diagram depicting a processing flow relating to this embodiment.

Shifting to a processing illustrated in FIG. 11 through terminal A, the voxel-value calculation unit 164 determines whether or not any unprocessed voxel exists among voxels within the set cross section (step S19). When there is an unprocessed voxel, the processing returns to the step S11 in FIG. 7 through terminal B. On the other hand, there is no unprocessed voxel, the drawing processing unit 165 performs a drawing processing (i.e. rendering processing) by using the voxel values calculated at the step S15 (step S21). At that time, after converting each of the calculated voxel values to a color according to a preset color map, the drawing processing unit 165 causes the display unit 150 to display the colors. The drawing processing itself is as conventionally known, and its further explanation is omitted.

Figure 12:
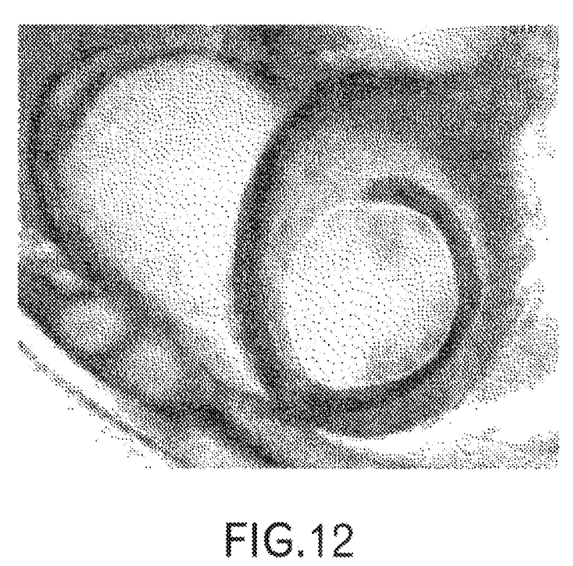
FIG. 12 is a diagram depicting a display example relating to this embodiment.
Figure 13:
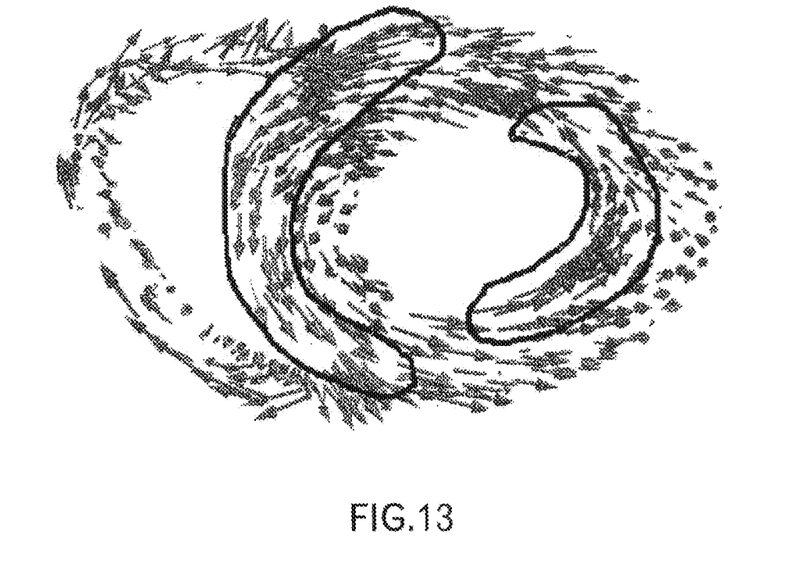
FIG. 13 is a diagram depicting a state of vectors that represent the fiber directions of the heart muscle on the cross section.

For example, instead of the display illustrated in FIG. 2, an image as illustrated in FIG. 12 is displayed. The state of the unit vectors representing the fiber direction of the heart muscle on the aforementioned cross section is as illustrated in FIG. 13. An area surrounded by a line represents an area in which a lot of vectors that are almost parallel with the cross section. Therefore, also in the image as illustrated in FIG. 12, a dark value appears on pixels at corresponding positions. When the voxel value represents the stress, the activity of the heart muscle, which is included in the simulation result, is reflected to the pixel values in relation with the cross section, and expressed in the image.

Then, the processing unit 160 determines whether or not time t reaches its maximum value (for example, a value determined from final data of the voxel data stored in the voxel data storage unit 110) (step S23). When time t has not reached its maximum value, the processing unit 160 increments t by "1" (step S25), and the processing shifts to the step S5 in FIG. 7 through the terminal C. When time t reached its maximum value, the processing ends.

By carrying out the aforementioned processing, it is possible to display the simulation result as the voxel data.

Although the embodiments of this invention were explained, this invention is not limited to those. The functional block diagram in FIG. 1 is an example, and does not correspond to the program module configuration. As for the processing flow, as long as the processing result does not change, the turns of the steps may be exchanged, and plural steps may be executed in parallel.

Furthermore, an example of the heart was explained above, however, other object such as organs other than the heart may be processed as described above. Moreover, in the aforementioned example, for each time t, the cross section is reset, however, the same cross section may be used according to the initial setting after t=1. As for the processing for adjusting the positions, the position adjustment is performed according to the instruction of the user initially, however, it is possible to omit the user's instruction by performing the same processing for adjusting the position after t=1.

Moreover, an example was explained in which the shape of the element in the geometric model data is tetrahedral, however, other shapes may be employed.

Figure 14:
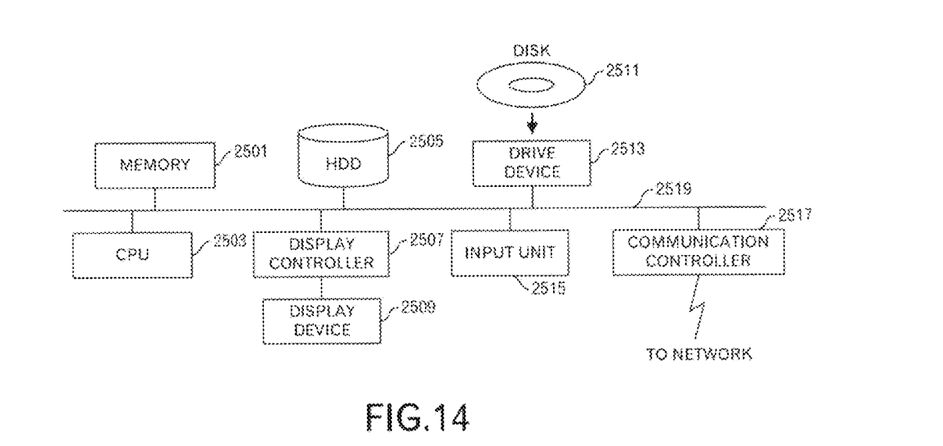
FIG. 14 is a functional block diagram of a computer.

In addition, the aforementioned display processing apparatus 100 is a computer device as illustrated in FIG. 14. That is, a memory 2501 (storage device), a CPU 2503 (processor), a harddisk drive (HDD) 2505, a display controller 2507 connected to a display device 2509, a drive device 2513 for a removable disk 2511, an input unit 2515, and a communication controller 2517 for connection with a network are connected through a bus 2519 as illustrated in FIG. 14. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform predetermined operations. Moreover, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the application programs systematically cooperate with each other, so that various functions as described above in details are realized.

The aforementioned embodiments are outlined as follows:

A display processing method according to the embodiment includes: (A) performing a processing for adjusting positions of voxel data for an object and data of a geometric model for the object; (B) calculating, for each voxel included in a range defined by a cross section among plural voxels that are included in the voxel data, a voxel value of the voxel from physical values in elements of the geometric model, which are included in a predetermined range of the voxel, based on a relation between the cross section and first vectors, wherein a first vector of the first vectors is set for one element of plural elements included in the geometric model, the first vectors represent a direction of an inner structure of the object, and the cross section is set for the voxel data and the geometric model data; and (C) rendering an image by using the voxel value calculated for each voxel.

By doing so, it is possible to draw data of the geometric model, as the voxel data, according to the relation between the cross section and first vectors that represent the inner structure of the object.

Moreover, the aforementioned calculating may include weighting a physical value in each element in the geometric model, which is included in a second predetermined range of the voxel, according to a length of a second vector obtained when projecting the first vector of the element onto the cross section. Thus, a greater weight is set for an element whose first vector is almost parallel to the cross section. In other words, a state of the first vector representing the inner structure of the object can be reflected to the set cross section to be drawn. For example, in case of the vector representing the fiber direction of the heart muscle, it is possible to emphasize the magnitude of the stress of the heart muscle, for example, for the vector that is parallel to the set cross section.

Furthermore, the calculating may further include: calculating an average value of weighted physical values, as the voxel value. For example, the physical values of elements of the geometric model, which relate to each voxel, are reflected.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A computer-readable, non-transitory storage medium storing a program for causing a computer to execute a process, the process comprising:
    performing a processing for adjusting positions of voxel data for an object and data of a geometric model for the object;
    calculating, for each voxel included in a range defined by a cross section among a plurality of voxels that are included in the voxel data, a voxel value of the voxel from weighted physical values that are obtained by weighting, for each of elements of the geometric model, a physical value that is set in the element, according to a length of a first vector obtained when projecting a second vector that is set for the element and represents a direction of an inner structure of the object onto the cross section, wherein the elements are included in a predetermined range of the voxel, and the cross section is set for the voxel data and the geometric model data; and
    rendering an image by using the voxel value calculated for each voxel.

2. The computer-readable, non-transitory storage medium as set forth in claim 1, wherein the calculating further comprises:
    calculating an average value of the weighted physical values, as the voxel value.

3. A display processing method, comprising:
    performing, by using a computer, a processing for adjusting positions of voxel data for an object and data of a geometric model for the object;
    calculating, by using the computer and for each voxel included in a range defined by a cross section among a plurality of voxels that are included in the voxel data, a voxel value of the voxel from weighted physical values that are obtained by weighting, for each of elements of the geometric model, a physical value that is set in the element, according to a length of a first vector obtained when projecting a second vector that is set for the element and represents a direction of an inner structure of the object onto the cross section, wherein the elements are included in a predetermined range of the voxel, and the cross section is set for the voxel data and the geometric model data; and
    rendering, by using the computer, an image by using the voxel value calculated for each voxel.

4. A display processing apparatus, comprising:
    a memory; and
    a processor coupled to the memory and configured to:
        perform a processing for adjusting positions of voxel data for an object and data of a geometric model for the object;
        calculate, for each voxel included in a range defined by a cross section among a plurality of voxels that are included in the voxel data, a voxel value of the voxel from weighted physical values that are obtained by weighting for each of elements of the geometric model, a physical value that is set in the element, according to a length of a first vector obtained when projecting a second vector that is set for the element and represents a direction of an inner structure of the object onto the cross section, wherein the elements are included in a predetermined range of the voxel, and the cross section is set for the voxel data and the geometric model data; and render an image by using the voxel value calculated for each voxel.

* * * * *